BEST AVAILABLE COPY

BEST AVAILABLE COPY

H. WIARD.
Plow.

No. 9,190. Reissued May 4, 1880.

*Witnesses:*
J. F. Greenough
Lin. W. Hall.

*Inventor:*
Harry Wiard

N. PETERS, PHOTO-LITHOGRAPHER, WASHINGTON, D. C.

UNITED STATES PATENT OFFICE.

HARRY WIARD, OF SYRACUSE, NEW YORK.

PLOW.

SPECIFICATION forming part of Reissued Letters Patent No. 9,190, dated May 4, 1880.

Original No. 197,918, dated December 4, 1877. Application for reissue filed February 24, 1880.

DIVISION B.

*To all whom it may concern:*

Be it known that I, HARRY WIARD, of Syracuse, New York, have invented certain new and useful Improvements in Plows, of which the following is an amended description for the reissue of the original Letters Patent therefor, No. 197,918.

My inventions herein described relate to the adjustable shield on the land-side, by which the castings are readily fitted after casting without regard to shrinkage, insuring a perfect joint at the front edge between the land-side, mold-board, and point.

Figure 1:
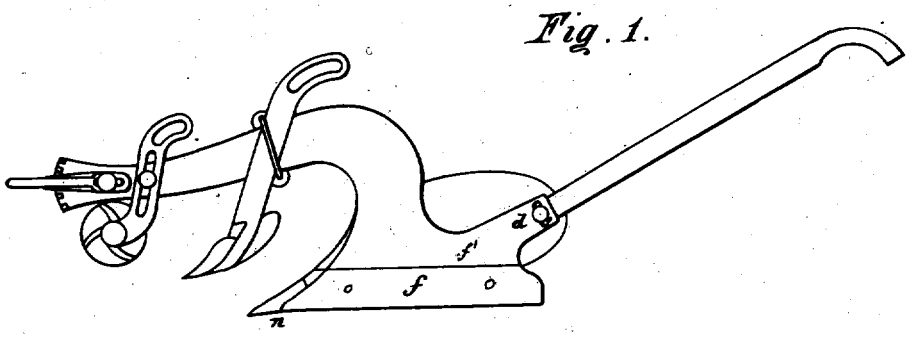
Figure 2:
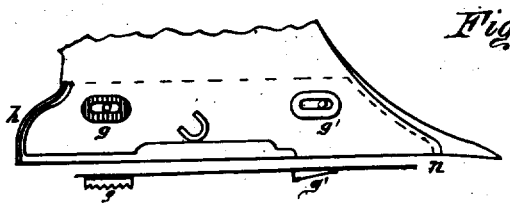

Referring to the drawings, the description is as follows: Figure 1, land-side elevation of the plow and shield; Fig. 2, section of the inside of the land-side.

The land-side *f'* is formed with a recess along its lower section, over which, at the front edge, the mold-board and point project at *n*. Into this recess a strip or shield, *f*, fits, that fills out the space made by the recess flush with the face of the land-side. This shield is so constructed as to slide forward to the projecting edge of the point and make a close fit at the joint *n* therewith. This strip *f* shields the land-side at the wearing-points, having a shoe on its lower edge that projects under the lower edge of the land-side, and a flange, *h*, at its rear end, that covers the joint between them.

There are oblong holes *g g'* through the land-side, (see Fig. 2,) through which screw-bolts pass, projecting inward from round holes in the shield, by which the shield is adjusted and held in place, so that it can be moved up to the front bearing, forming the joint at *n*, aforesaid, thus compensating for any inequality of shrinkage.

The oblong holes *g g'* may have a serrated rim around their inner face, or they may be made an inclined plane, so as to secure the shield firmly in place, washers being fitted thereto, through which the screw-bolts pass, with nuts on their inner ends to securely hold the parts together.

I am not aware that this construction and combination of parts, all of which are necessary to perfect the invention, have ever before been made.

The inner face of the wheel-standard is made smooth and flush to fit the face of the beam of the plow. On one side of the oblong slot *d* there are serrated depressions or notches, that fit onto a cog or boss projecting from the face of the beam, to prevent the standard from moving after it is set, but gives the greatest freedom for adjustment of the standard and wheel. The standard thus formed will also fit a smooth-faced beam without any projection.

Having thus fully described my improvements in plows, I claim—

In combination, the adjustable shield or strip *f*, fitted into the land-side in the manner described, and covering the joints between them, as specified, and held up to its place by the bolts, flanged slots *g g'*, and washers, in the manner and for the purposes substantially as herein set forth.

HARRY WIARD.

Witnesses:
LEVI W. HALL,
J. J. GREENOUGH.